P. W. WALTZ.
STEAM POWER AUTOMOBILE WHEEL.
APPLICATION FILED JUNE 14, 1920.
1,376,594.
Patented May 3, 1921.
3 SHEETS—SHEET 3.
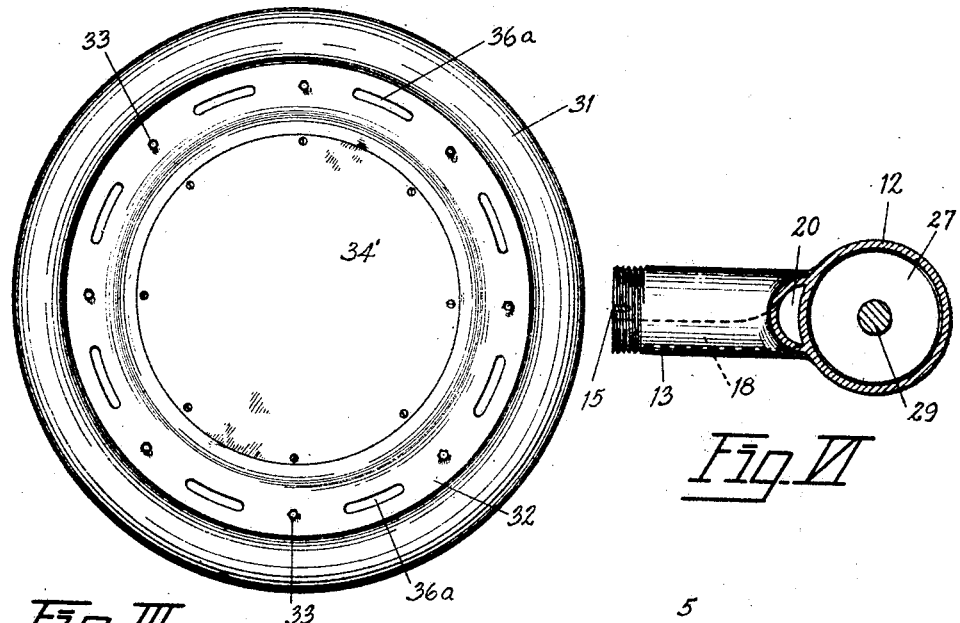
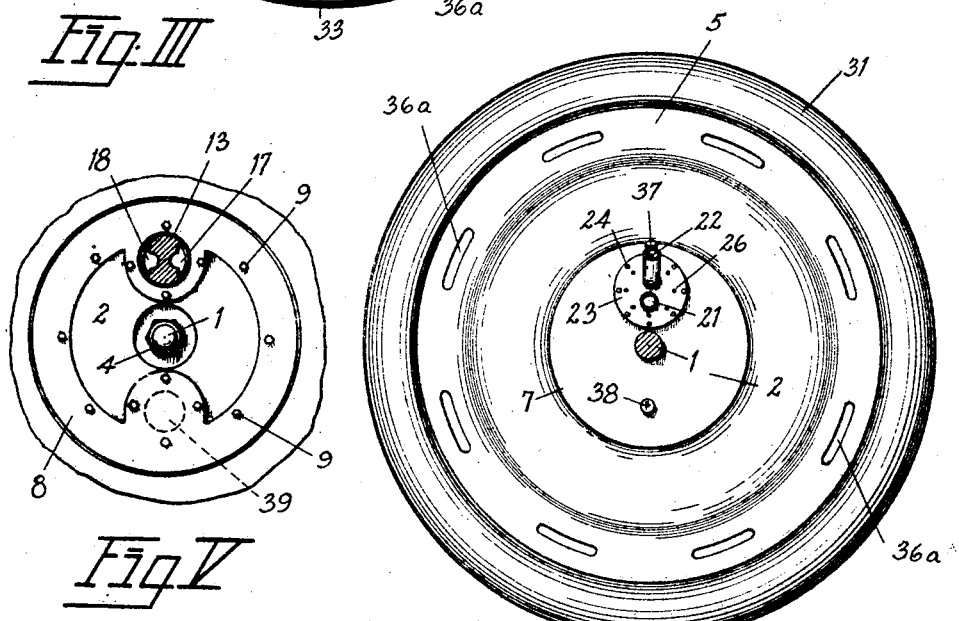
WITNESS
Guy E. Savage.
INVENTOR
P. W. Waltz.
BY
C. B. Goldberg
ATTORNEYS

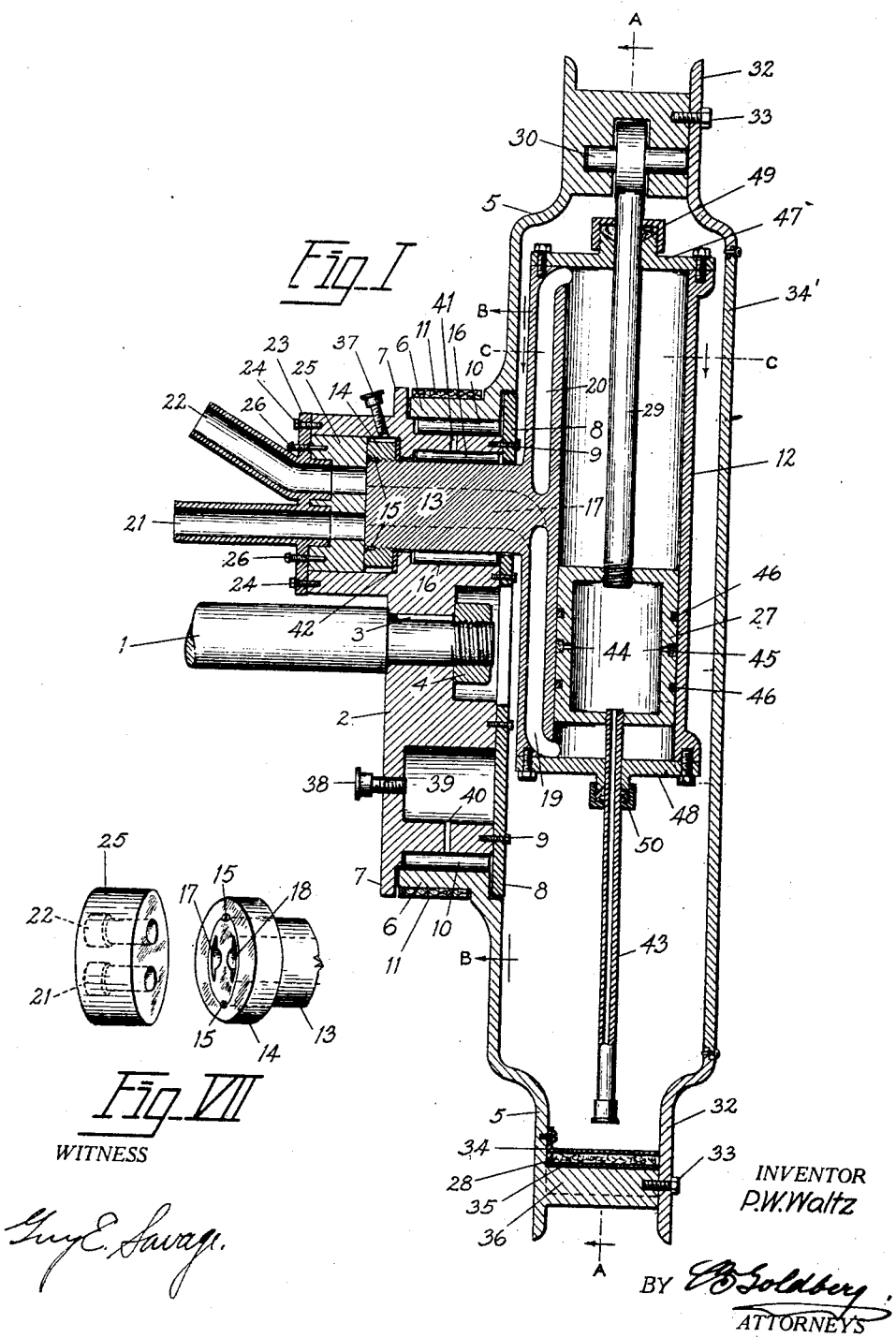

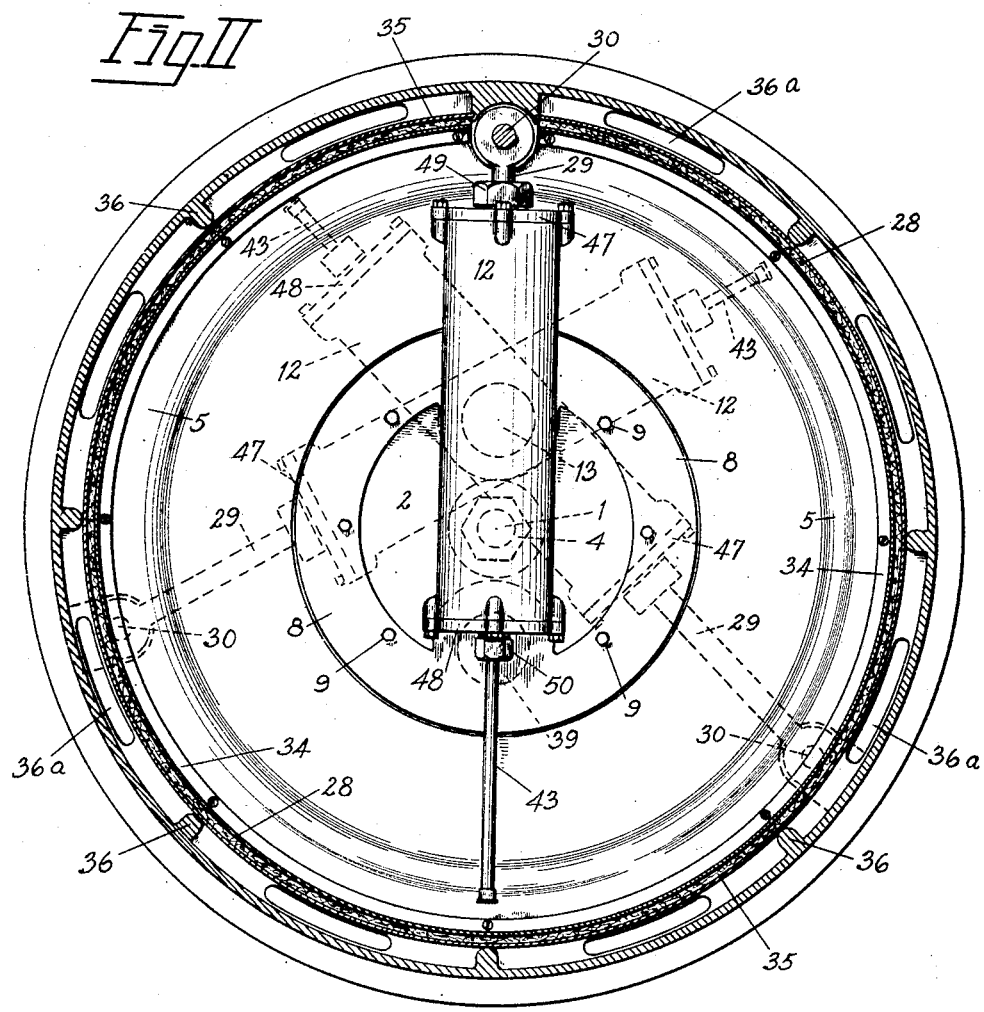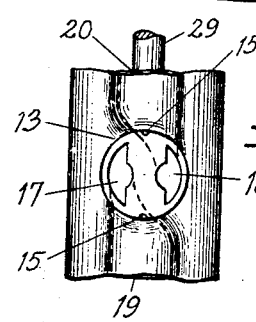

UNITED STATES PATENT OFFICE.

PHILIP W. WALTZ, OF PORTLAND, OREGON.

STEAM-POWER AUTOMOBILE-WHEEL.

1,376,594.      Specification of Letters Patent.      Patented May 3, 1921.

Application filed June 14, 1920. Serial No. 388,760.

*To all whom it may concern:*

Be it known that I, PHILIP W. WALTZ, a citizen of the United States, residing at Portland, in the county of Multnomah and State of Oregon, have invented a new and useful Steam-Power Automobile-Wheel, of which the following is a specification.

My invention relates to improvements in steam-power automobile wheels in which the cylinder, piston and valve are essentially a part of the wheel structure itself.

The objects of my invention are:

First, to transform all the four wheels of an automobile into independent motors for the exercise of tractive efforts.

Second, to substitute the cheaper steam for the more expensive gasolene as motive power.

Third, to eliminate the customary transmission gearing and gain thereby more power for locomotion.

Fourth, to furnish a simple mechanism for imparting a powerful rotative force to the wheel.

Fifth, to make the whole mechanism easily accessible for repairs.

Sixth, to provide a fool and trouble proof valve mechanism.

Other objects and advantages are to be found in the combination of parts and in the details of construction as will be described hereafter.

I attain these objects with the mechanism illustrated in the accompanying drawing, in which—

Figure I is a vertical cross section through the entire apparatus.

Fig. II is a section through Fig. I along the line A—A, the cylinder, however, being shown in full and alternate positions thereof in dotted lines.

Fig. III is an elevation of the wheel including the rubber tire, as viewed by an observer outside the vehicle.

Fig. IV is the reverse of Fig. III.

Fig. V is an elevation of the end plate which holds the wheel to the stationary hub; the view is indicated by line B—B in Fig. I.

Fig. VI is a sectional view of the detached cylinder; the section line being indicated by C—C in Fig. I.

Fig. VII shows in perspective view and separated from each other the two friction surfaces where the steam cut-off takes place.

Fig. VIII is an end view of the arbor with a portion of the cylinder in the background to illustrate the position of the steam-ports in relation to the cylinder.

Similar numerals refer to similar parts throughout the several views.

The axle 1 in Fig. I is non-rotatable and serves to support the body springs of the automobile (not shown). The hub 2 is rigidly secured to the end of the axle 1 by means of a key 3 and nut 4. The wheel 5 is provided with an outwardly extending annular flange 6 which is slipped over the hub 2 and held thereon by the flange 7 of the hub on one side, and on the other side by the end plate 8 which latter is held to the hub by suitable screws 9. Roller bearings 10 are interposed between flange and hub to eliminate friction as much as possible. The usual brake band is indicated by 11 on the outer circle of the flange 6.

The upper portion of the hub 2 is built out in a suitable manner, bored, and counterbored to receive the various elements by which steam is admitted to the cylinder 12. For the latter purpose an arbor 13 projects at right angles from the cylinder about midway between the two ends. Said arbor entering the hub from the inside of the wheel 5 through a perforation in the end plate 8, and being rotatively secured therein by a collar nut 14 in the counterbore. Small set-screws 15 prevent an involuntary loosening of the collar nut from the arbor. The roller bearings 16 insure a frictionless rotation for the arbor. Ports 17 and 18 extend throughout the full length of the arbor and communicate with the interior of the cylinder by means of the canals 19 and 20. The relative position of the ports to the canals is most clearly indicated in Figs. VI and VIII.

Reverting back to Fig. I, the live steam is admitted through the pipe 21, while pipe 22 serves for the exhaust. Both popes are cast solid with the cover 23 and can thus be firmly affixed to the wall of the counterbore by means of the screws 24. To insure a steamtight joint between the pipes and the arbor, and also to compensate for any wear, there is a washer 25 inserted between these two elements. This washer has two apertures in alinement with the steam and exhaust pipes, and fits sleevelike over the projecting stub ends of said pipes, so that adjustment in depth may be secured without disconnecting the washer from the pipes. Any wear between the washer and the end of the arbor 13 with its collar nut 14 is compensated by a tightening of the adjusting screws 26 in the cover 23. A detached view of the washer and also of the end of the arbor with the collar nut is shown in Fig. VII.

The piston 27 in the cylinder 12 has its piston rod 29 pivotally attached in suitable bearings 30 in the rim of the wheel 5; the power applied to the piston is therefore transferred to the rim of the wheel and imparts rotation to said wheel.

The actual operation is as follows: In the position illustrated in Fig. I, and also by the full lines in Fig. II, both ports 17 and 18 in the arbor 13 are closed, no steam can enter or leave the cylinder, the piston is at the end of the stroke, and the piston rod stands at "dead center", that is the axis of the piston rod lies vertically in line with the axis of the arbor and the axis of the wheel. As the wheel begins to rotate clockwise the cylinder is also forced to rotate around its arbor whereby the ports 17 and 18 gradually aline themselves with the pipes 21 and 22 respectively. Steam to the cylinder is admitted through the canal 19 and the piston is propelled toward the other end of the cylinder, while exhaust simultaneously takes place through the canal 20. Full alinement of the ports with the pipes and therewith a maximum of admission and exhaust occurs when the cylinder and piston rod have assumed a horizontal position. From then on admission and exhaust gradually diminish until the pivotal point represented by the bearing 30 has reached the lowest point in its travel, and piston rod and cylinder stand vertical once more.

By the further rotation of the wheel the above described process is repeated, except that live steam in this case is admitted through the port 18 and canal 20, while exhaust takes place through canal 19, the port 17, and thence through the pipe 22 into the customary condenser.

During a full revolution of the wheel steam is thus twice admitted and just as often exhausted therefrom. The momentum of the rotating wheel is relied upon to overcome the dead center; should one wheel come to a stop on a dead center, the other three wheels must help out; the probability that all four wheels should stop on dead centers is too remote a contingency to cause much concern, but if it should actually happen, the automobile must be shifted a few inches by hand.

Reverse motion is effected by means of a reversible valve, not shown in the drawings, which causes the live steam to enter the pipe 22, and connects the pipe 21 with the condenser.

The rubber tire, designated in Figs. III and IV by the numeral 31, is held on the wheel rim by a flange 32, said flange being secured by the screws 33. A cover 34' on the flange protects the interior of the wheel from dust and damage.

A heat insulating ring near the rim prevents excessive heat from reaching the rubber tire. Said ring is most clearly illustrated in Fig. II, and consists of two metal strips 34 and 35, the former being bolted to the side of the wheel 5, and the latter resting against some projections 36 extending inwardly from the wheel rim, these projections being also utilized to contain the screw holes for the screws 33. The space between the strips 34 and 55 is filled with asbestos 28 or some other suitable insulating material. By means of the slots 36ᵃ outside air is permitted to circulate freely through the hollow space between wheel rim and the insulating ring, the heat transmitted from the cylinder to the rim is thereby kept at a minimum.

It now remains to refer to some minor, yet not unessential details of construction. The friction surfaces between the collar nut 14 and the washer 25 can be lubricated through the oil cup 37. Another oil cup 38 enables a filling of the oil chamber 39 from whence, through a canal 40 the roller bearings 10 are oiled. A sufficient amount of oil is carried upward by the travel of the roller bearings to supply, through the canal 41, the roller bearings 16 around the arbor. A bronze washer 42 at the bottom of the counterbore furnishes a smooth bearing surface for the rotating collar nut 14. Through the pipe 43 grease can be pressed into the interior of the piston 27, from here the grease is gradually transferred through the openings 44 to the felt ring 45 for the purpose of lubricating the cylinder walls. 46 are piston rings of standard construction. The cylinder heads 47 and 48 are equipped with suitable packing glands 49 and 50 for the piston rod and grease pipe respectively.

Having thus described my invention, a few advantages may be mentioned particularly. One of them is the manner in which steam is automatically admitted to the cylinder or cut off therefrom, the possibility of a faulty valve adjustment is thereby completely eliminated. Removal of the cover 34' quickly permits an inspection of the interior of the wheel; should anything go wrong, the end plate 8 is easily unscrewed and the whole wheel can be placed on a work bench for repair. No crawling on one's back underneath the automobile as there is no transmission mechanism to get out of order. Nor is this wheel limited to the use of auto- mobiles. Attaching the wheel anywhere to a wall, connecting it with the steam boiler, and substituting the rubber tire for a belt, transforms the apparatus into a driving pulley. To adapt this wheel to the use of aeroplanes all that is needed is to attach propeller blades to the rim. In the case of tractors, locomotives, gear drives etc., merely a slight modification of the rim is required, and all these various applications are considered to fall within the scope of my invention.

I also reserve to myself the right to make minor changes in other details of construction, providing I do not violate the spirit and principle of my invention.

I claim:

1. In an automobile wheel, the combination of a rigid axle, a non-rotating hub at the end of the axle, a wheel structure having at one side an outwardly extending flange mounted on the hub, and an end plate screwed to the hub to hold said flange in place, with steam-operated means within the wheel structure to impart rotation to said wheel, and with means to supply steam through the non-rotating hub.

2. In an automobile wheel, the combination of a wheel structure mounted for rotation on a non-rotating hub, with a cylinder having an arbor at right angles to the cylinder walls, said arbor being mounted in the hub eccentrically to the wheel structure, roller bearings around the arbor, and a piston in the cylinder, said piston acting on the rim of the wheel structure and imparting rotation to said wheel.

3. In an automobile wheel, the combination of a wheel structure mounted for rotation on a non-rotating hub, with a cylinder, an arbor at the center of the cylinder projecting at right angles from the cylinder wall, said arbor being mounted in the hub rotatably and eccentrically to the axis of the wheel structure, ports extending throughout the length of the arbor and communicating with the interior of the cylinder, and means to admit steam through the ports into the cylinder.

4. In an automobile wheel, the combination of a wheel structure, a non-rotating hub to mount the wheel structure, steam-pipes entering the hub eccentrically to the wheel structure, with an engine having a laterally extending arbor, ports in said arbor to admit steam from the pipes to the engine, an adjustable washer between the pipes and the end of the arbor to furnish a steam-tight working surface between the two last-named elements, said engine rotating in unison with the wheel structure and through the rotation automatically establishing or interrupting communication between the engine and the steam-pipes.

5. In an automobile wheel, the combination of a wheel structure mounted for rotation on a non-rotating hub, with an engine rotating in the plane of the wheel structure and in unison therewith but on an axis eccentrically to the wheel structure, said engine comprising a cylinder, a hollow piston, a felt ring around the piston capable of receiving lubricant from the interior of the piston, a pipe screwed in one end of the piston to fill said piston with lubricant, and a piston rod screwed in the other end of the piston, said piston rod being pivotally attached to the rim of the wheel structure and exerting tangential pressure on said rim.

6. In an automobile wheel, the combination of an inclosed wheel structure having a rim adapted to receive a rubber tire, with a steam engine operating within the inclosure, and heat insulating means between the engine and rim, said heat insulating means comprising an asbestos ring in spaced relation to the rim, and a ventilated air space between the rim and the asbestos ring.

Signed by me at Portland, Oregon, this 8th day of June, 1920.

PHILIP W. WALTZ.